Figure 1:
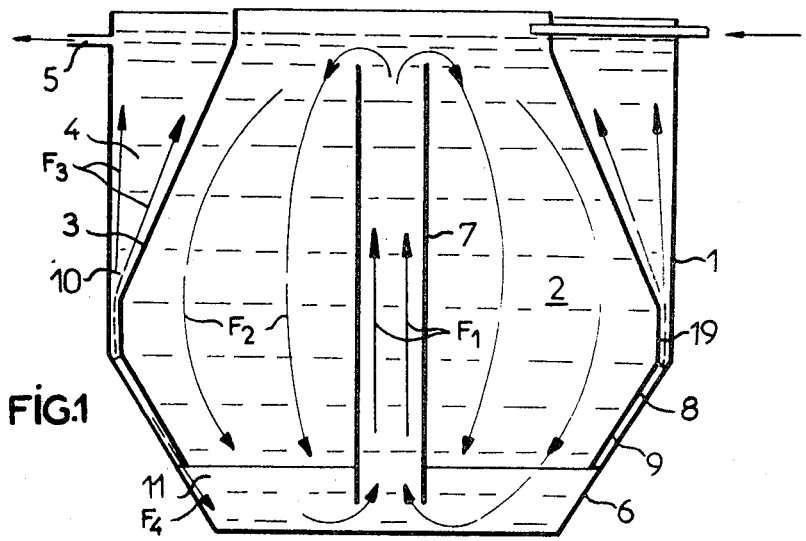

United States Patent
Le Quinquis

[15] 3,706,380
[45] Dec. 19, 1972

[54] APPARATUS FOR TREATMENT OF SEWAGE

[72] Inventor: Jean Pierre Le Quinquis, Sainte Luce sur Loire, France

[73] Assignee: Compagnie d'Etudes et de Recherches des Services operationnels d'Assaignissement en France Compaigne SOAF, Boulogne, S/Seine, France

[22] Filed: May 20, 1971

[21] Appl. No.: 145,346

[30] Foreign Application Priority Data

May 20, 1970 France.............................7018243

[52] U.S. Cl. ..................210/197, 210/209, 210/512, 210/532
[51] Int. Cl. .............................................B01d 21/00
[58] Field of Search....210/63, 83, 84, 202, 207, 260, 210/521, 512, 209, 532, 197, 194

[56] References Cited

UNITED STATES PATENTS

| | | | |
|---|---|---|---|
| 2,780,360 | 2/1957 | Bon et al........................210/197 UX |
| 2,069,024 | 1/1937 | Vohmann et al..................210/84 X |
| 1,458,805 | 6/1923 | Christensen..........................210/83 |

*Primary Examiner*—Reuben Friedman
*Assistant Examiner*—F. F. Calvetti
*Attorney*—Christen and Sabol

[57] ABSTRACT

An installation for the treatment of sewage comprises a tank having an inner wall dividing the tank into a central digestion zone and peripheral zones of decantation and removal of treated effluents, the lower portion of the tank being in the form of a reversed truncated cone and having a series of small upwardly directed conduits connecting the bottom of the tank with the upper zone of decantation.

10 Claims, 2 Drawing Figures

PATENTED DEC 19 1972 3,706,380

APPARATUS FOR TREATMENT OF SEWAGE

The present invention relates to improvements in installations for the treatment of residual waters by passage into treatment tanks containing micro-organisms in suspension.

The tanks for treating polluted water by aerobic oxidation of the type to which the present invention relates, comprise in known manner an enclosure containing the fluid medium to be treated, an internal truncated wall delimiting a peripheral quietening zone where the treated and decanted effluents are removed and a central treatment or activation zone; this latter comprises a central chimney provided with an oxygenating device of the type with compressed air inflation or surface ventilator, maintaining a circulation of the effluent being treated, rising in the central chimney and falling to the base of the tank in the annular part comprised between the central chimney and the internal truncated wall.

The removal of the treated and evacuated effluents from the peripheral decantation zone maintains in this zone a rising movement of the liquid towards the removal spouts; for the purpose of obtaining a good operation and a good yield for the installation, the rising speed of the liquid medium should remain slower than the average speed of sedimentation or of dropping of the particles suspended in the liquid medium, said particles being intended to be taken up at the base of the tank and recirculated in the digester medium.

This aim is difficult to achieve, unless the output of the removed and evacuated effluents is considerably reduced, this decelerating the operation and lowering the yield of the decanter; moreover, the problem of the removal of purified effluents is made all the more difficult in the conventional decanters as the rising current of the effluents rising in the decantation zone to be evacuated is produced in countercurrent with the falling movement of the effluents treated and recirculated in the activation zone; this results in turbulences which cause slurry and slimy vesicles to rise in the decantation zone where the ascending flow movement is produced which is of whirling nature opposing the sedementation of the particles in suspension entrained in the current and therefore not decanted.

The present invention aims at remedying these disadvantages and contributes a solution to the problem of decantation of the effluents entrained in the peripheral decantation zone towards the spouts.

The invention relates to this end to an installation for treating sewage by bacterial digestion of the type constitued of a cylindrical tank resting on a base in the form of a reversed truncated cone and comprising an inner truncated wall delimiting a peripheral zone for decanting and removing the treated effluents and a central chimney associated with an oxygenation device, the treatment installation being characterized in that the inner wall delimiting the peripheral decantation zone and of truncated form is extended at its base by means placing the decantation zone in communication with the base of the tank and forming a plurality of conduits of small section.

As will be developed later, the multiple conduits or channels by which the decantation zone communicates with the base of the activation cell provoke a laminar flow of the water and progressively reduce the rising speed of the water, this favoring a sedimentation of the particles.

According to an embodiment of the invention, the wall delimiting the zone of decantation is formed of an upper truncated cone and a lower, reversed truncated cone, disposed parallel to the reversed one constituting the base of the tank, the reversed truncated cone forming the base of the decanter and the reversed one forming the base of the tank being disposed concentrically with respect to each other and being connected by radial partitionings defining passages or conduits by which the upper decantation zone communicates with the lower part of the activation cell.

The partitionings or channels connecting the bases of the activation cell and the decanter may be part of the wall or of one or the other of the elements brought together and connected.

The partitionings connecting the base of the tank of the digester and the base of the decanter are preferably inclined in the plane tangential to the truncated base of the decanter and from an angle with respect to the generatrix of this truncated base.

The angle formed by the partitionings with respect to the generatrices of the trancated base of the digester or the truncated base of the tank which is parallel thereto is preferably of the order of 40° to 50°.

According to another embodiment of the invention, the partitionings are disposed along a helical path.

The wall of the decanter is preferably formed of two truncated cones whose large bases are opposite one another, connected by a short cylindrical element, the upper cone being provided with a generator angle of the order of 60° the lower reversed cone forming the base being provided with a generator angle of the order of 50° and identical to the generator angle of the truncated cone forming the base of the tank, so that the respective bases of the tank and the decanter are parallel and concentric.

The respective bases of the tank and the decanter are preferably disposed a few centimeters from one another.

The number and proximity of the channels or partitionings connecting the respective bases of the decanter and the aeration tank are determined by the operational conditions of the installation and in particular by the rate of flow of the treated water and the desirable rising speed in the decanter as a function of the charges or the degree of pollution of the water.

The conduits or channels obtained in accordance with the invention and communicating the decantation zone with the base of the aeration tank make it possible, by a rolling effect of the current to achieve a laminar flow of the streams of water guided from the base of the tank towards the decantation zone; moreover, the losses of load causes by the passage along the walls and the partitionings limits the rising speed of the particles, the largest of them remaining at this level by the wall effect whilst waiting to be later disengaged the reform towards the central zone, these conditions therefore permit a good decantation.

Moreover, the streams of currents produced at the entrance of the channels are directed obliquely with respect to a radial plane followed by the streams of treated water recirculated from the central chimney; it follows that the rising streams guided towards the decantation zone do not leave in countercurrent with respect to the recirculated water streams, but rathermore along a tangential plane, thus avoiding the turbulances and the entrainement of the particles in suspension.

These particles decanted from the decantation zone fall to the base of the channels where they are taken by the recirculated water currents towards the base of the digester and taken up by the central chimney.

Finally, the channels created according to the invention increase the probabilities of meeting between particles in suspension or with the walls; the formation of agglomerates of heavy particles falling to the base of the tank and taken up by the recirculation device is thus favored.

The direction of inclination of the channels or partitionings delimiting the channels is preferably contrary to the direction of rotation of the ventilator, in the case where the oxygenation is obtained by a ventilator.

The invention will be described in greater detail with reference to the accompanying drawings, in which;

FIG. 1 is a sectional view of an installation according to the invention.

Figure 2:
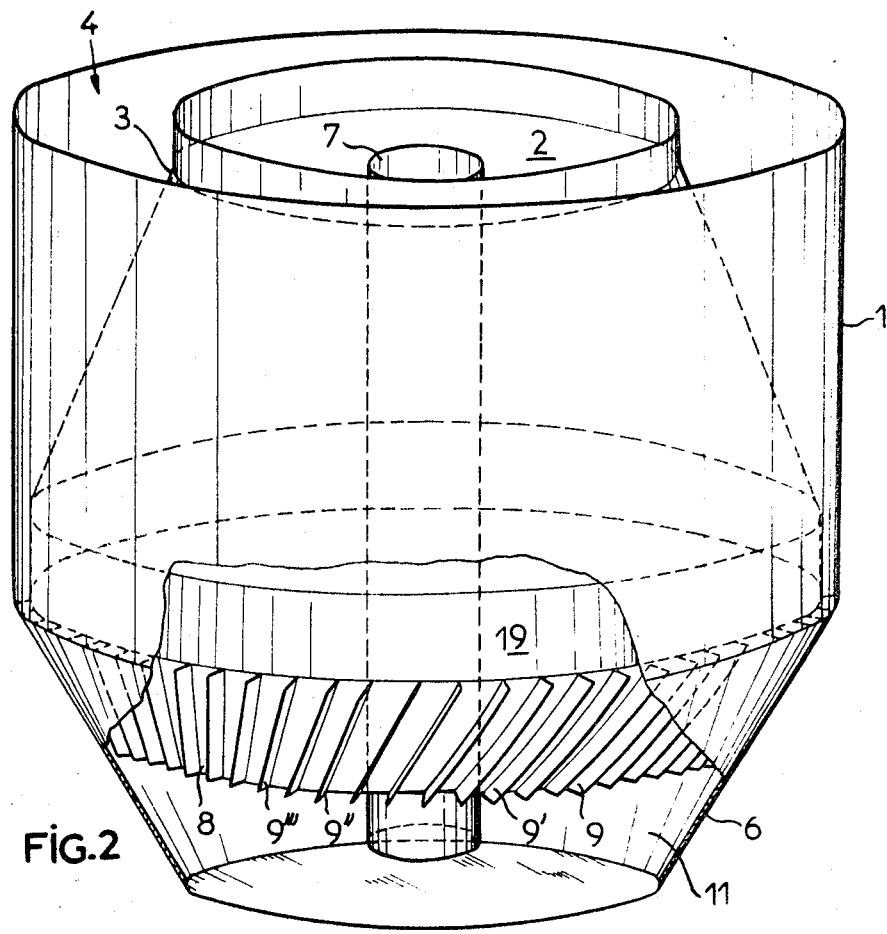

FIG. 2. shows a perspective view, with parts to cut away of the installation according to the invention.

Referring to the drawings, the installation according to the invention comprises in known manner a tank 1 constituting the treatment enclosure and containing the sewage 2 subjected to bacterial digestion; an inner wall 3 isolates a peripheral decantation zone 4 from which the treated water is removed through a spout 5.

The base of the tank is in the form of a reversed truncated cone 6.

A central chimney 7, associated with an inner device for the oxygenation and circulation of the water (not shown in the drawings) permits a central rising circulation and a return of the water by the outside.

According to the invention, the inner wall 3 delimiting the decantation zone and in the form of a cone is extended at its lower part by a base 8 beyond a short central cylindrical part 19.

The truncated base 8 is concentric and parallel to the base 6 of the tank and it is separated theref m by a space of a few centimeters thickness.

Channels or partionings 9, 9', 9'', 9''' formed of small bars, plates or sections disposed radially and inclined with respect to the generatrix of the base 8 of the decanter are unitary with this base 8 and abut against the base 6 of the tank; between two adjacent channels or partitionings, a channel is thus formed by which the lower part of the decantation zone communicates with the activation cell 11. This plurality of channels communicating the decantation zone with the central part of the ventilation volume permits a substantial improvement in the yield of the volume of ventilation for the reasons that have been given previously.

The arrows F 1, shown in FIG. 1, show the rising current of the water in the recirculation chimney, arrows F 2 showing the return of the water in the outer zone, the arrows F 3 show the rising current of the water in the decantation zone further to the removal in spout 5. Arrows F 4 show the direction of sedimentation and decantation of the particles at the base of the decantation zone and in the channels defined by the partionings.

According to the invention, the partitionings could be replaced by conduits or tubes disposed side by side at the base of the decanter.

I claim:

1. Installation for the treatment of sewage by bacterial digestion comprising a tank having an outer circumferentially extending wall joined with a closed bottom wall, an inner circumferentially extending wall spaced inwardly from said outer wall, the annular space between said inner and outer walls defining peripheral zones for decantation and removal of treated effluents, a centrally disposed vertical chimney means open at both ends, the lower end thereof being in communication with liquid adjacent the bottom of the tank, said chimney means including means for circulating liquid upwardly through the chimney means and means for oxygenating said circulating liquid, whereby oxygenated liquid will be circulated downwardly in the space between said chimney means and said inner wall and recirculated through the chimney means, the lower portion of the outer wall being defined by a reversed truncated cone, the lower margin of the inner wall being spaced from the bottom of the tank to permit flow of treated effluent peripherally upwardly into said zones of decantation and removal, the lower portion of the space between the inner and outer walls being subdivided into a plurality of upwardly directed conduits, inlet means to conduct sewage into space within said inner circumferential wall, and outlet means communicating with said zone of decantation for removal of treated effluent.

2. The installation defined in claim 1, wherein the upper portion of said inner wall is defined by an upright truncated cone and the lower portion thereof is defined by a reversed truncated cone disposed concentrically with respect to the lower portion of said outer wall, said plurality of upwardly directed conduits being defined by a series of radially disposed partitions.

3. The installation defined in claim 2, wherein said radially disposed partitions are integral with the inner wall and are connected with the outer wall.

4. The installation defined in claim 2, wherein said radially disposed partitions are integral with the outer wall and are connected with the inner wall.

5. The installation defined in claim 2, wherein said radially disposed partitions are inclined in the plane tangential to the surface of the lower portion of the outer wall and angularly disposed with respect to the generatrix of said outer wall.

6. The installation defined in claim 5, wherein said angular disposition of said partitions lie between the limits of 40° to 50°.

7. The installation defined in claim 1, wherein said upwardly directed conduits are disposed in parallel helical directions with respect to the vertical axis of the tank.

8. The installation defined in claim 2, wherein the medial portion of said inner wall is defined by a cylinder of revolution, the generatrix of the upper portion of the inner wall is inclined at an angle of approximately 60° with respect to a transverse plane, the generatrix of the lower portion of the inner wall is inclined at an angle of approximately 50° with respect to a transverse plane and the lower portions of the inner and outer walls are parallel and concentric.

9. The installation defined in claim 1, wherein the distance between the lower portions of said inner and outer walls is a few centimeters.

10. The installation defined in claim 1, wherein the upper portion of the zone of decantation is connected with the lower portion of the tank by a series of peripherally arranged channels comprising conduits arranged angularly with respect to the generatrix of the lower portion of said outer wall.

* * * * *